United States Patent
Rechel et al.

(10) Patent No.: US 10,797,503 B2
(45) Date of Patent: Oct. 6, 2020

(54) SYSTEM AND METHOD FOR PROVIDING BIDIRECTIONAL TRANSIENT VOLTAGE SUPPORT AND POWER

(71) Applicant: Maxwell Technologies, Inc., San Diego, CA (US)

(72) Inventors: David Rechel, San Diego, CA (US); Mikael Setterberg, San Diego, CA (US); Stefan Werkstetter, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 16/107,937

(22) Filed: Aug. 21, 2018

(65) Prior Publication Data

US 2019/0115766 A1    Apr. 18, 2019

Related U.S. Application Data

(60) Provisional application No. 62/548,877, filed on Aug. 22, 2017.

(51) Int. Cl.
*H02J 7/00* (2006.01)
*H02J 7/34* (2006.01)
*H02J 1/12* (2006.01)

(52) U.S. Cl.
CPC ............ *H02J 7/008* (2013.01); *H02J 7/0014* (2013.01); *H02J 7/0026* (2013.01); *H02J 7/0031* (2013.01); *H02J 7/0078* (2013.01); *H02J 7/0091* (2013.01); *H02J 7/345* (2013.01); *H02J 1/12* (2013.01)

(58) Field of Classification Search
CPC ........ H02J 7/008; H02J 7/0014; H02J 7/0026; H02J 7/0031; H02J 7/0078; H02J 7/0091; H02J 7/345
USPC .................................................. 320/116–119
See application file for complete search history.

(56) References Cited

U.S. PATENT DOCUMENTS

| 2010/0133025 A1* | 6/2010 | Flett | B60K 6/46 |
| | | | 180/65.22 |
| 2010/0181828 A1* | 7/2010 | Handa | B60L 7/16 |
| | | | 307/9.1 |

FOREIGN PATENT DOCUMENTS

| CN | 106240337 | 12/2016 |
| EP | 2500206 | 9/2012 |
| WO | WO 2011/152086 | 12/2011 |
| WO | WO 2013/118612 | 8/2013 |

\* cited by examiner

*Primary Examiner* — Zixuan Zhou
(74) *Attorney, Agent, or Firm* — Knobbe, Martens, Olson & Bear, LLP

(57) ABSTRACT

An apparatus for storing energy includes a plurality of energy storage cells, a switching circuit configured to control a transient voltage support to a battery provided by the plurality of energy storage cells, a charging circuit configured to charge the plurality of energy storage cells, and a processing system. The processing system is configured to control the charging circuit to charge the plurality of energy storage cells, and control the switching circuit to control the transient voltage support of the plurality of energy storage cells to the battery. The switching circuit and the charging circuit provide parallel paths between the plurality of energy storage cells and the battery terminal.

14 Claims, 19 Drawing Sheets

SYSTEM AND METHOD FOR PROVIDING BIDIRECTIONAL TRANSIENT VOLTAGE SUPPORT AND POWER

CROSS-REFERENCE TO RELATED APPLICATIONS

This Application claims the benefit of U.S. Provisional Application No. 62/548,877, filed Aug. 22, 2017, and entitled "SYSTEM AND METHOD FOR PROVIDING BIDIRECTIONAL TRANSIENT VOLTAGE SUPPORT AND POWER" and assigned to the assignee hereof. The disclosure of this prior application is considered part of this application, and is hereby incorporated by reference in its entirety.

BACKGROUND

Field

The present disclosure relates generally to energy storage devices and systems, such as capacitor and/or battery modules and systems, including ultra-capacitors and super-capacitors, and in particular, capacitor and/or battery systems configured to provide bidirectional transient voltage support and additional functions as needed by externally coupled systems.

Description of the Related Art

Various techniques exist for constructing capacitor and/or battery modules (hereinafter "modules") used in direct current (DC) power systems. The modules may comprise multiple individual capacitor and/or battery cells (cells) to provide varied voltages based on a quantity of the included cells. The modules may store power for on demand use by various devices or systems coupled to the modules. Additionally, or alternatively, the modules may store power to support bidirectional transient voltages which an externally coupled system experiences. Modules that provide bidirectional transient voltage support and options for operation as power supplies within various operational constraints are desired.

Separate from, and/or in addition to the bidirectional transient voltage support, the stored power may be used as a source for an external demand (for example, starter motor, etc.). However, using the same cells as support for bidirectional transient voltage support and as a stored power source may be complicated by varied voltage loads and other design limitations. For example, the cells may have different limits in each direction for the bidirectional transient voltage support (for example, a 5-50 Amps (A) charging limit and a 200-500 A discharging limit). Furthermore, the output for the stored power source may be separate from the output for the bidirectional transient voltage support. The modules may include various components, such as controls that enable proper operation of the module such that the cells provide requested bidirectional transient voltage support and power supply support. Additionally, the modules may often include various other components to maintain charge of the cells contained therein within an operating range of voltages and components to protect the cells and other circuitry of the modules. Accordingly, modules that provide bidirectional transient voltage support and options for operation as power supplies within various operational constraints are desired.

SUMMARY

Embodiments disclosed herein address the above-mentioned problems with prior art. The systems, methods and devices of this disclosure each have several innovative aspects, no single one of which is solely responsible for the desirable attributes disclosed herein.

Various embodiments of methods and devices within the scope of the appended claims each have several aspects, no single one of which is solely responsible for the desirable attributes described herein. Without limiting the scope of the appended claims, some prominent features are described herein.

In one aspect, an embodiment of this invention comprises an apparatus for storing energy. The apparatus includes a plurality of energy storage cells, a switching circuit configured to control a transient voltage support to a battery provided by the plurality of energy storage cells, a charging circuit configured to charge the plurality of energy storage cells, and a processing system. The processing system is configured to control the charging circuit to charge the plurality of energy storage cells, and control the switching circuit to control the transient voltage support of the plurality of energy storage cells to the battery. The switching circuit and the charging circuit provide parallel paths between the plurality of energy storage cells and the battery terminal.

In another aspect, an embodiment of this invention comprises a method of controlling a plurality of energy storage cells. The method includes controlling a switching circuit to control a transient voltage support to a battery provided by the plurality of energy storage cells, and controlling a charging circuit to control a charge of the plurality of energy storage cells. The switching circuit and the charging circuit provide parallel paths between the plurality of energy storage cells and the battery terminal.

In another aspect, an embodiment of this invention comprises a non-transitory computer readable medium. The non-transitory computer readable medium includes instructions stored thereon that when executed by at least one processor of a computing device cause the computing device to: control a switching circuit to control a transient voltage support of the plurality of energy storage cells to a battery coupled to a battery terminal, and control a charging circuit to control a charge of the plurality of energy storage cells. The switching circuit and the charging circuit provide parallel paths between the plurality of energy storage cells and the battery terminal.

BRIEF DESCRIPTION OF THE DRAWINGS

Details of one or more embodiments of the subject matter described in this disclosure are set forth in the accompanying drawings and the description below. Although the examples provided in this disclosure are sometimes described in terms of capacitors or capacitor cells, the concepts provided herein may apply to other types of energy storage systems. Other features, aspects, and advantages will become apparent from the description, the drawings and the claims. Note that the relative dimensions of the following figures may not be drawn to scale.

FIG. 4 illustrates a schematic diagram for an exemplary DC/DC charger as shown in

FIG. 2.

DETAILED DESCRIPTION

Figure 1:
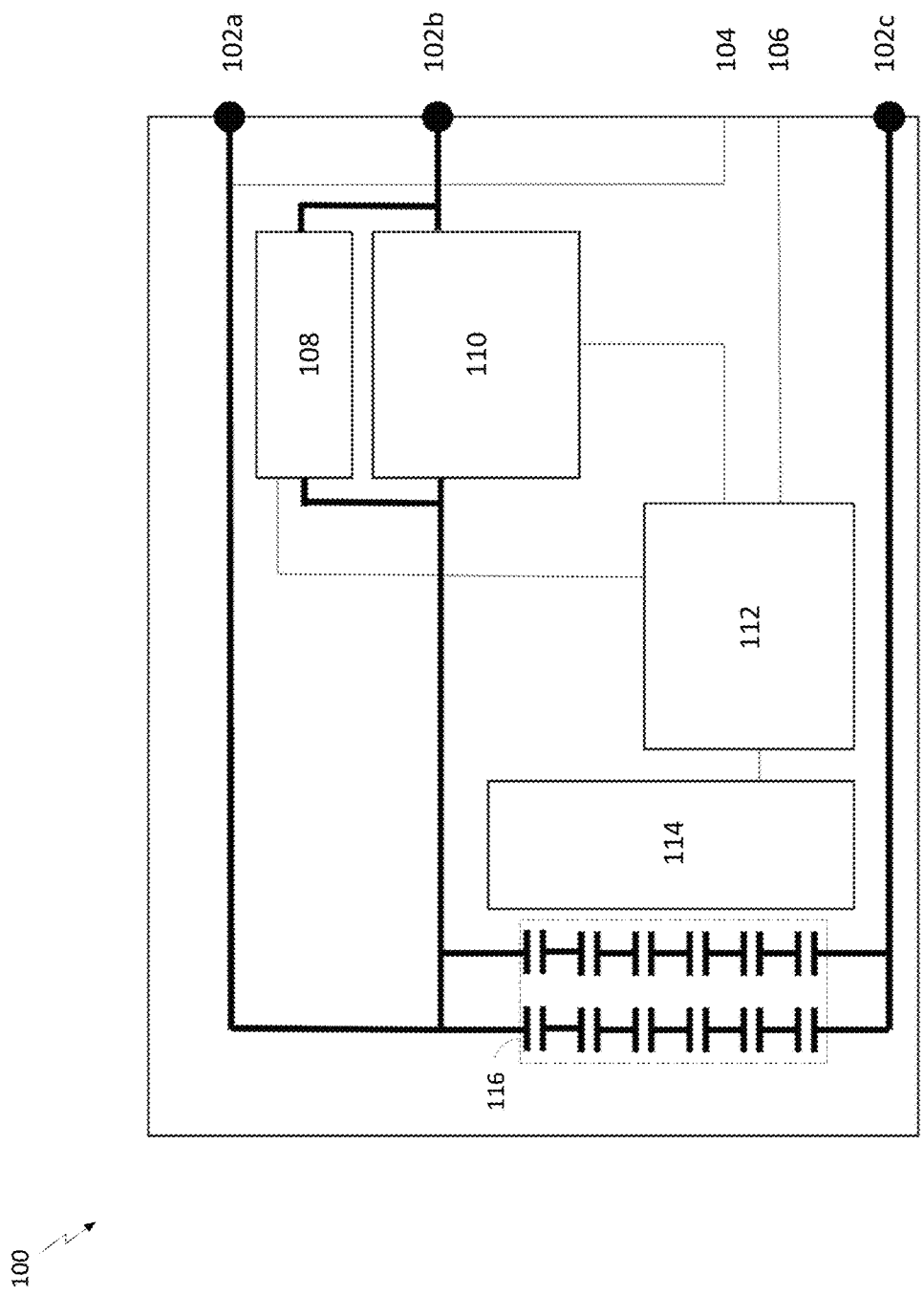
FIG. 1 illustrates a block diagram for a module comprising a plurality of components that together provide bidirectional transient voltage support and power supply support to a coupled power supply system, in accordance with an exemplary embodiment.

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specified details for the purpose of providing a thorough understanding of the exemplary embodiments. In some instances, some devices are shown in block diagram form.

Energy storage systems can include a plurality of individual capacitors and/or batteries arranged in series or parallel to form an energy storage module or bank (hereinafter module) which has a higher voltage output and/or storage capacity than an individual capacitor or battery. The energy storage module, in turn, can be connected in series with other energy storage modules to output even higher combined voltages and/or storage capacities. The individual batteries or capacitors of the energy storage module are sometimes referred to as battery or capacitor cells, or more generally, cells. The energy storage module may be referred to generally as modules.

Depending on the cells used in the module, various components may be included in the module to provide various functions. For example, the module may comprise a housing to house or contain each of the cells within a defined volume for ease of transport, installation, etc. The housing may provide structural support for the module as well as provide protection from environmental concerns (for example, debris, moisture, etc.). Additionally, the module may comprise one or more conductors or bus bars that electrically couple the cells together to obtain a desired voltage or circuit structure. The module may further comprise one or more terminals via which the module may be coupled to an external circuit, component, or system.

In some embodiments, the module of parallel or series arranged cells may be coupled to an external power source, batteries, and/or similar power systems, in a hybrid manner such that the module may provide bidirectional transient voltage support and/or be utilized as a separate power supply in addition to the external power source. For example, the module may couple to an external 12V and/or 24V battery system of an automobile or vehicle. Thus, the module may provide additional 12V/24V power to the coupled external battery system while also providing any bidirectional transient voltage support or compensation that the 12V/24V external system may require or utilize in operation. In some embodiments, the modules may couple to the 12V/24V external systems and also higher and/or lower voltage battery systems, for example in electric and/or hybrid vehicles. Accordingly, the module may provide the additional 12V/24V power while providing bidirectional transient voltage support on the 12V/24V external system and/or the higher and/or lower voltage electric or hybrid power system. The module may provide sufficient power to start and/or power any 12V/24V component (for example, a starter motor to start the vehicle, 12V/24V electronics, etc.) while also providing the bidirectional transient voltage support in voltages and/or currents different from those available when providing the power to the 12V/24V external system. While the external system described herein are described as being 12V/24V external systems, the module may operate in similar fashion for other voltage systems.

In some embodiments, the module may include one or more components or structure to provide the power to the 12V/24V component(s) and the bidirectional transient voltage support in parallel, at the same time, or without having to disconnect and reconnect the module. Such a parallel structure may provide for dual use of the cells contained in the modules. However, such parallel structure may increase complexity of the one or more components and/or a circuitry of the module. For example, when providing bidirectional transient voltages, the module may include components and/or circuitry to control or limit one or more parameters with which the cells of the module are charged or discharged. For example, the module components and/or circuitry may implement a charge limit of between 5 and 50 A with a discharge limit of between 100 and 500 A. In some embodiments, these limits may be the same regardless of the 12V/24V (or other) battery system to which the module is coupled. In some embodiments, these limits may be dynamic based on the 12V/24V (or other) battery system to which the module is coupled or based on operating conditions. For example, the charge and discharge limits may be changed while the module is coupled to the 12V/24V (or other) battery system, for example as a voltage or other parameter of the coupled battery system fluctuates during operation. In some embodiments, the changes may be made automatically by a controller of the module or coupled battery system or a user via a user interface. In some embodiments, the changes to the limits may be made when the module is coupled to a different battery system. Additionally, or alternatively, controls, circuitry, and/or components may be included in the module to dynamically maintain a balanced voltage in and/or across the cells of the module.

FIG. 1 illustrates a block diagram for a module comprising a plurality of components that together provide bidirectional transient voltage support and power supply support to a coupled power supply system, in accordance with an exemplary embodiment. The module 100 includes three (3) terminals 102a-c, a voltage sense output 104, a control input 106, a switching circuit 108, a charge circuit 110, a module controller 112, a cell balancing circuit 114, and one or more cells 116.

The terminals 102a-c may be terminals via which the module 100 couples to the external battery system (not shown). The module 100 may thus be charged by, provide the power supply support to, and/or provide the bidirectional transient voltage support to the external battery system via the terminals 102a-c. For example, the terminal 102a may couple the module 100 to a bus or similar connection of the external battery system and provide a current or voltage to one or more loads (for example, supplementing a current or voltage) of the external battery system (for example, a motor starter, etc.). The terminal 102b may couple the module 100 to one or more buses or circuits of the external battery system to which the module 100 may provide bidirectional transient voltage support (for example, an external battery, and so forth). The terminal 102c may couple the module 100 to a ground connection bus or to ground (for example, an earth ground).

The sense output 104 may provide a sense voltage (or other signal component) measurement of the voltage being conveyed via the terminal 102a. The control input 106 may comprise an external signal via which the external battery system controls activation or deactivation of operation of the module 100 or controls one or more operations or parameters (for example, the current or voltage limits) of the module 100. For example, the external battery system may turn on/off an ability for the cells 116 to be charged based on the control input 106. Additionally, or alternatively, the external battery system may control activation or deactivation of the bidirectional transient voltage support functionality of the module 100 based on the control input 106.

The switching circuit 108 and the charge circuit 110 may be coupled in parallel to the external battery system (for example, to a bus and/or to the battery) via the terminal 102b. The module 100 may charge the cells 116 of the module 100 based on power from the battery (or other external battery system component) based on one or more control signals from the charge circuit 110. Alternatively, or additionally, the module 100 may provide the bidirectional transient voltage support to the battery (or other external battery system component) via the switching circuit 108. In some embodiments, the charge circuit 110 may control the module 100 to charge or discharge the cells 116 in parallel with the switching circuit 108 so that the cells 116 are charged and/or discharged while also being used for bidirectional transient voltage support. In some embodiments, the switching circuit 108 and the charge circuit 110 may control the module 100 to charge and/or discharge the cells 116 when the switching circuit 108 is not using the cells 116 for bidirectional transient voltage support.

In some embodiments, the charge circuit 110 may comprise various components to control charging of the cells 116 of the module 100. The switching circuit 108 may comprise various components to control the transient voltage flow between the cells 116 and the battery. Thus, both the switching circuit 108 and charge circuit 110 couple the cells 116 to the terminal 102b.

The module controller 112 may control one or more components of the module 100. For example, the module controller 112 may control one or more of the switching circuit 108, the charge circuit 110, and the balancing circuit(s) 114. In some embodiments, the control of either or both of the switching circuit 108 and the charge circuit 110 may be based on the control input 106. For example, the control input 106 may control activation and/or deactivation of one or more of the power charge circuit 110 and the switching circuit 108 by the module controller 112 based on the control input 106. Alternatively, or additionally, the control of the switching circuit 108 and/or the charge circuit 110 may be based on operation of the module 100. For example, the module controller 112 may disallow charging of the cells 116 via the terminal 102b when the switching circuit 108 is providing bidirectional transient voltage support via the terminal 102b. Similarly, the module controller 112 may disallow the bidirectional transient voltage support when the cells 116 are being charged via the terminal 102b. In some embodiments, the module controller 112 may control the balancing circuits 114 of the cells 116 based on one or more internal decisions by the module controller 112 or the control input 106.

Figure 2:
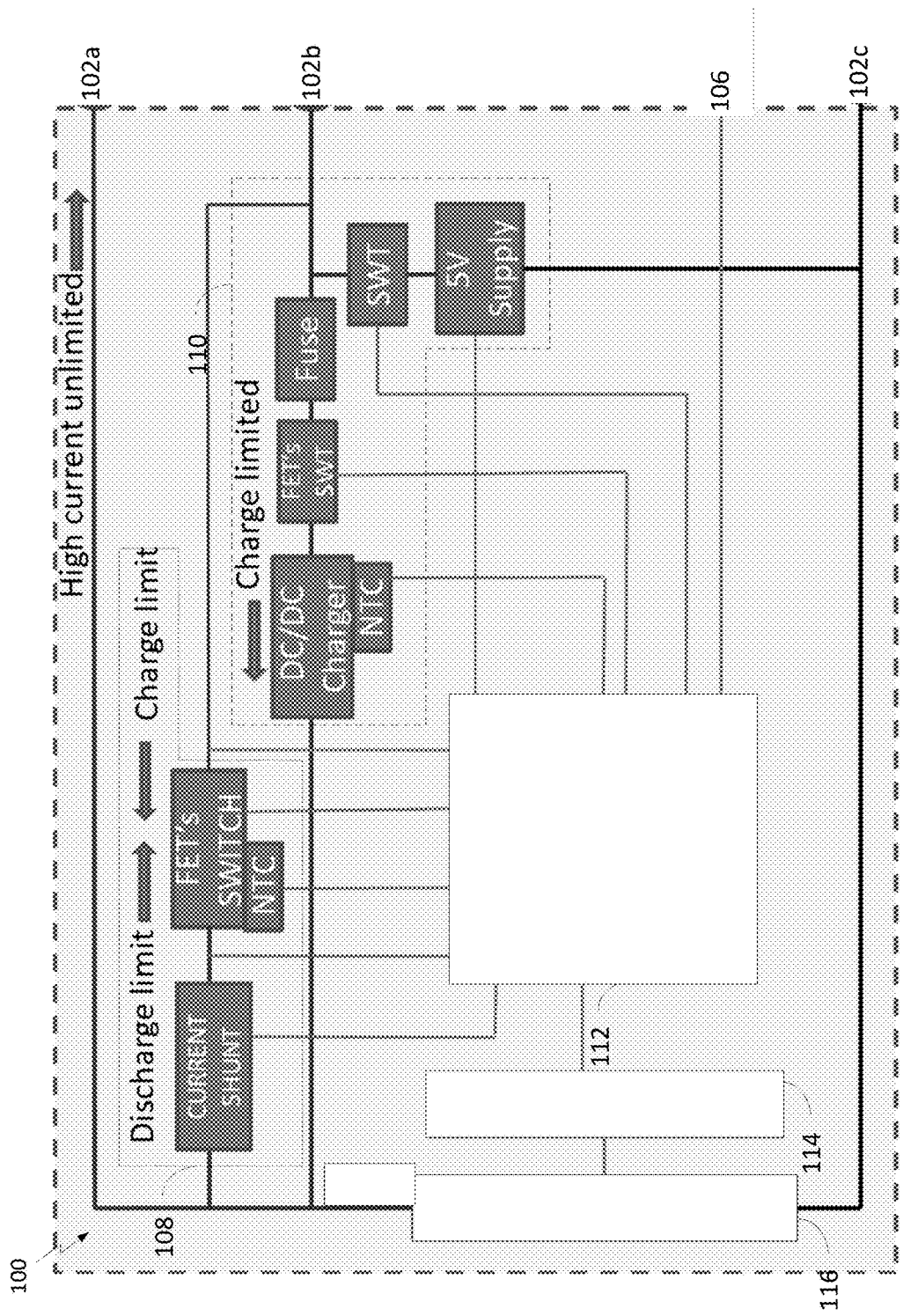
FIG. 2 illustrates an exemplary detailed block diagram for the module of FIG. 1.
Figure 3A:
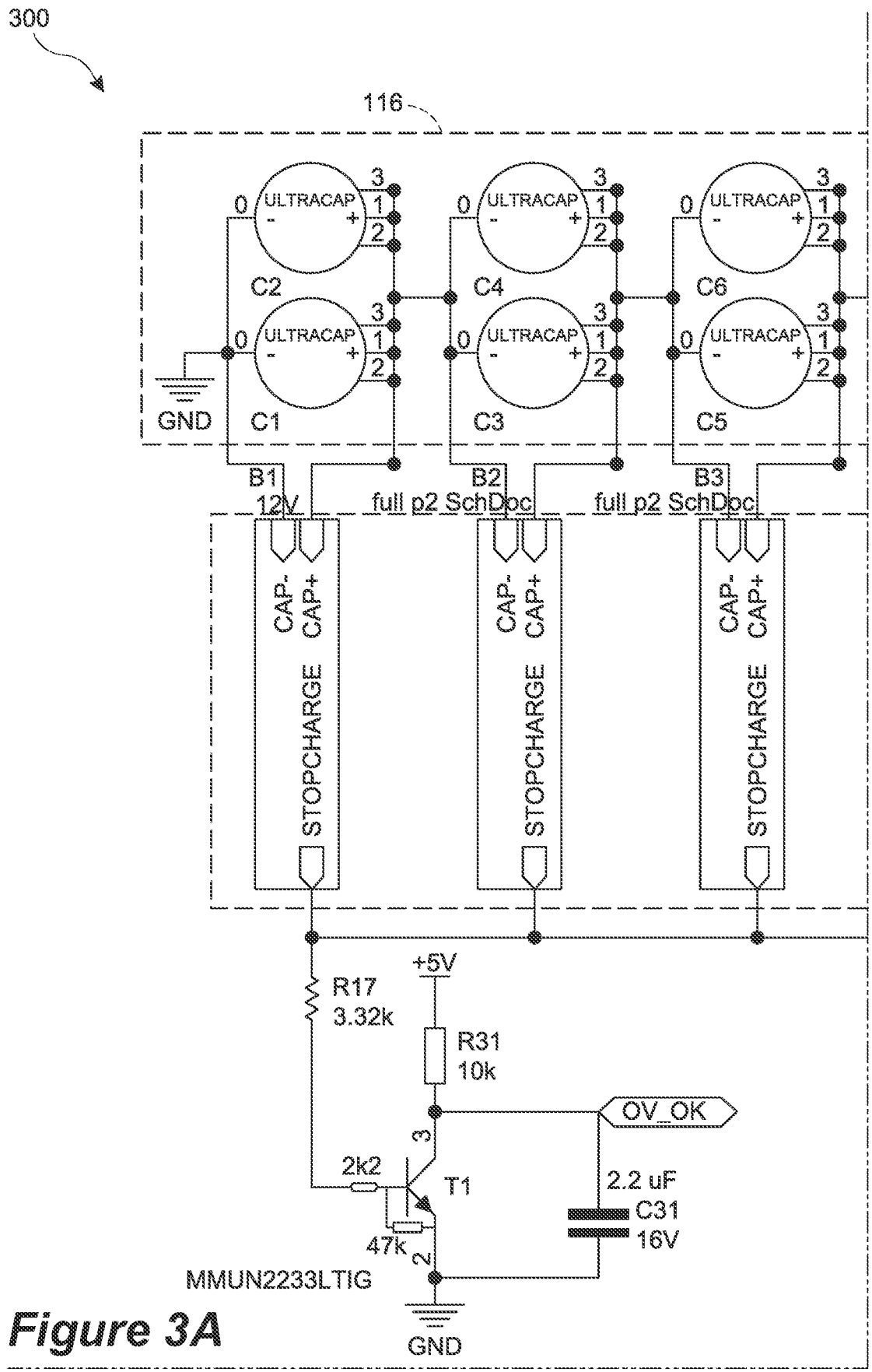
FIG. 3 illustrates a schematic diagram for an exemplary implementation of the block diagrams of FIGS. 1 and 2.
Figure 3B:
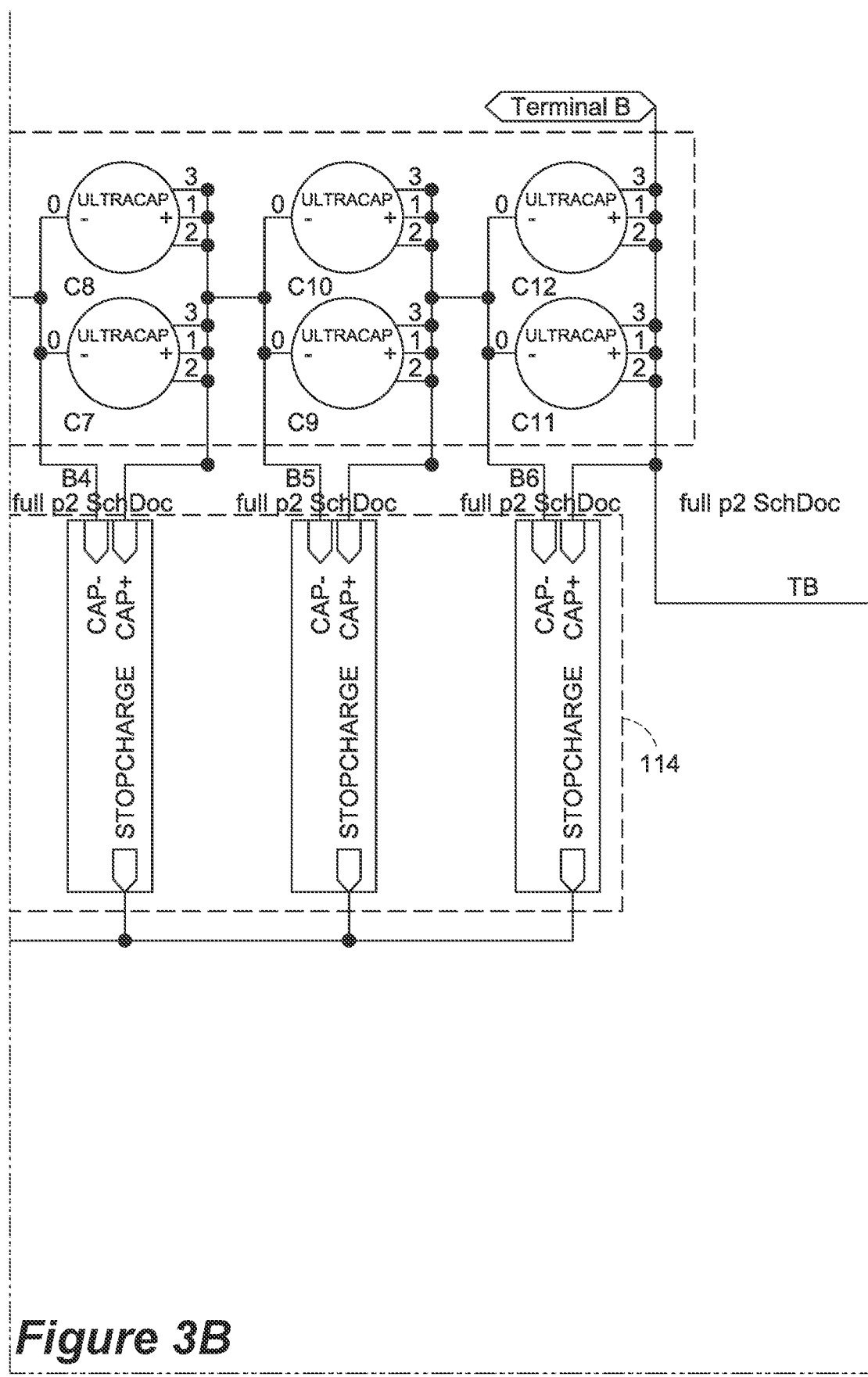
Figure 3C:
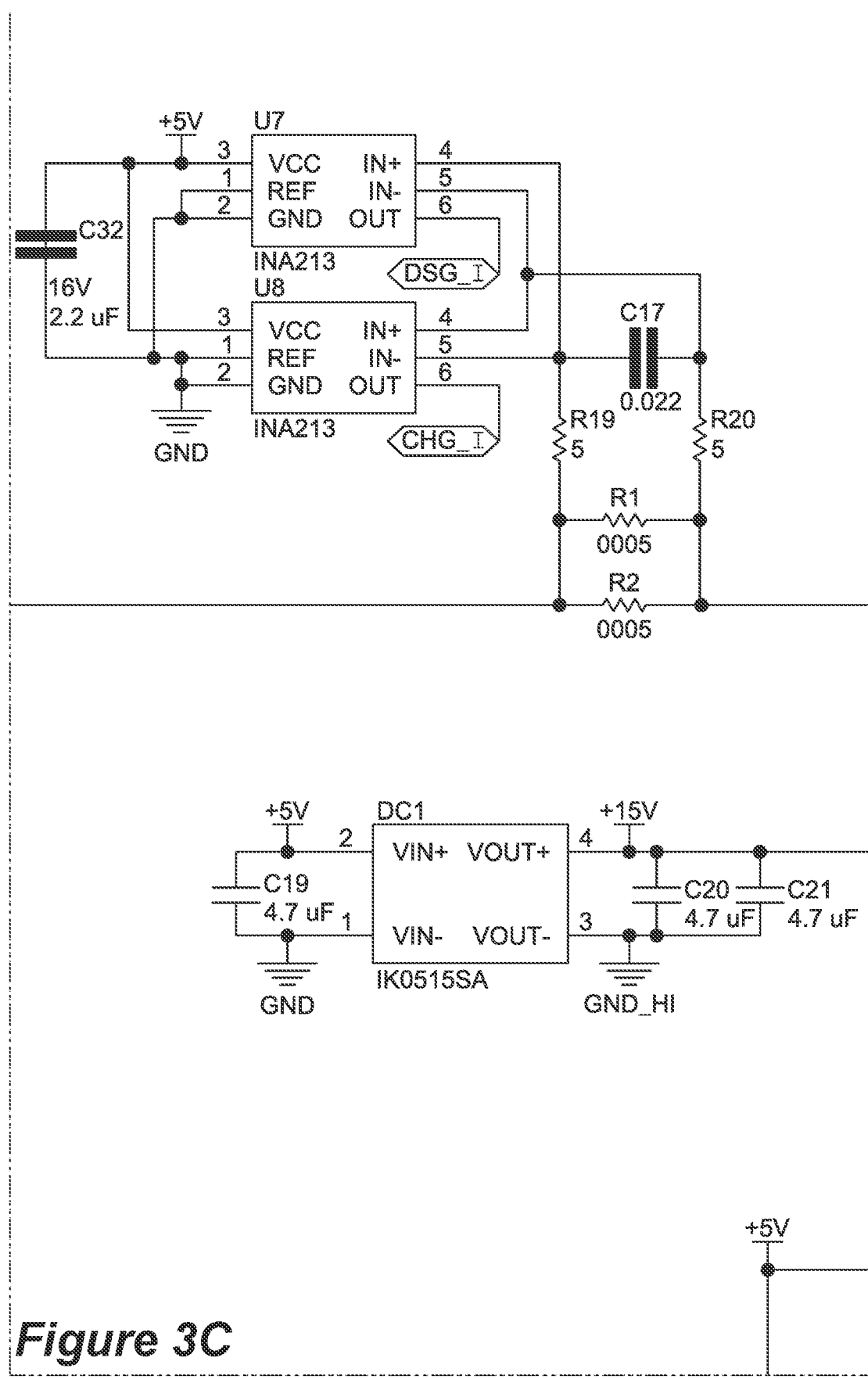
Figure 3D:
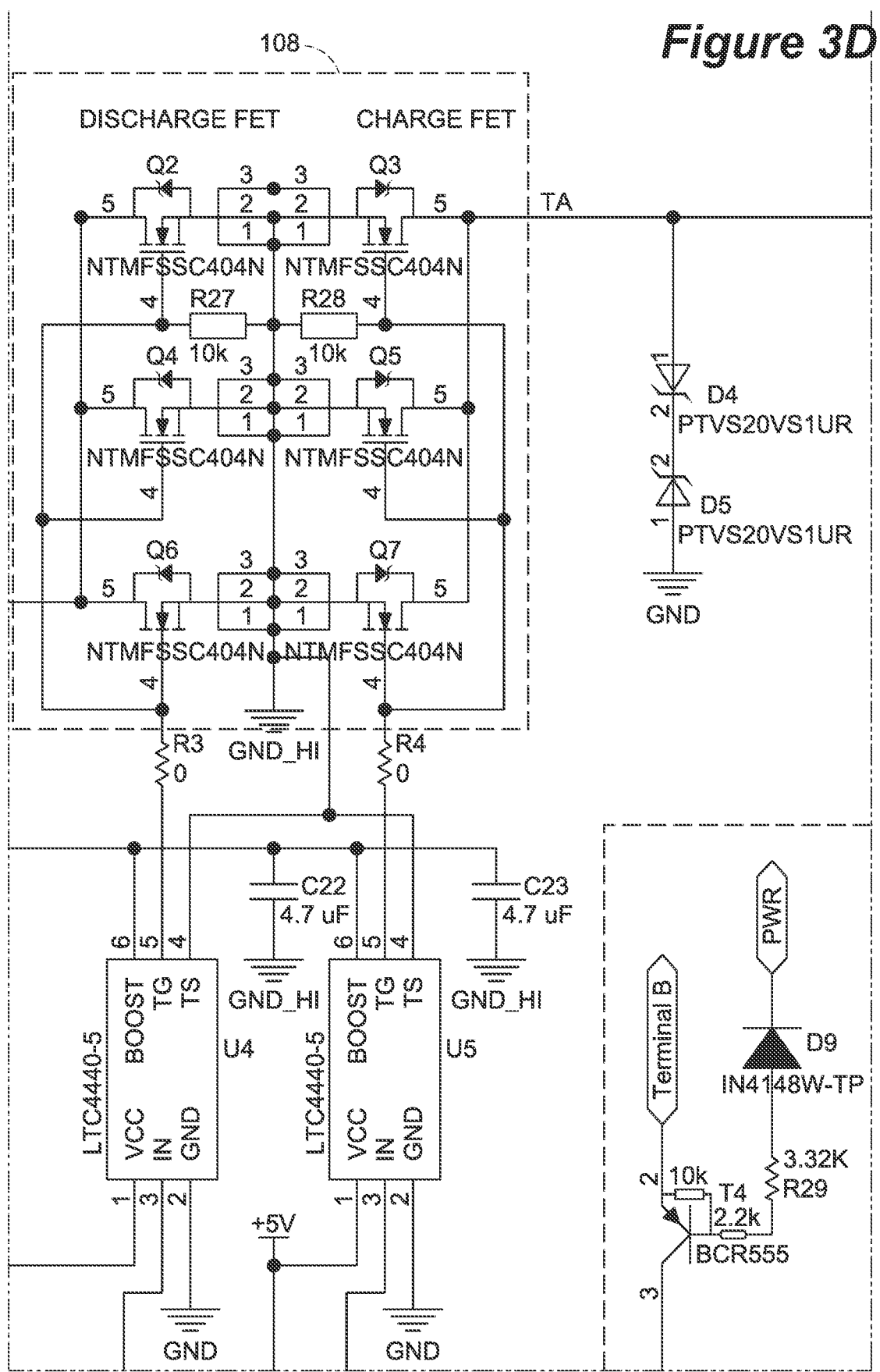
Figure 3E:
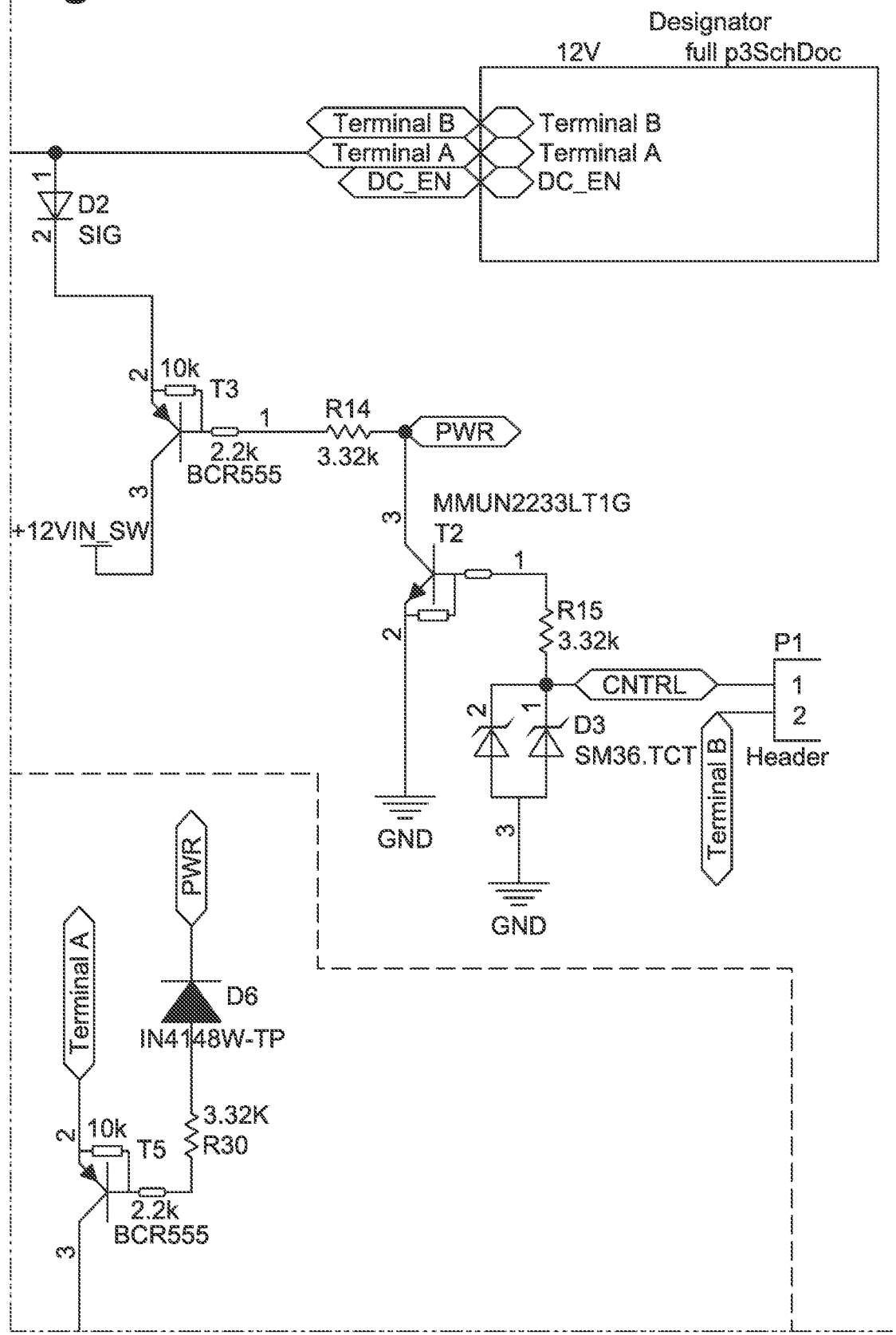
Figure 3F:
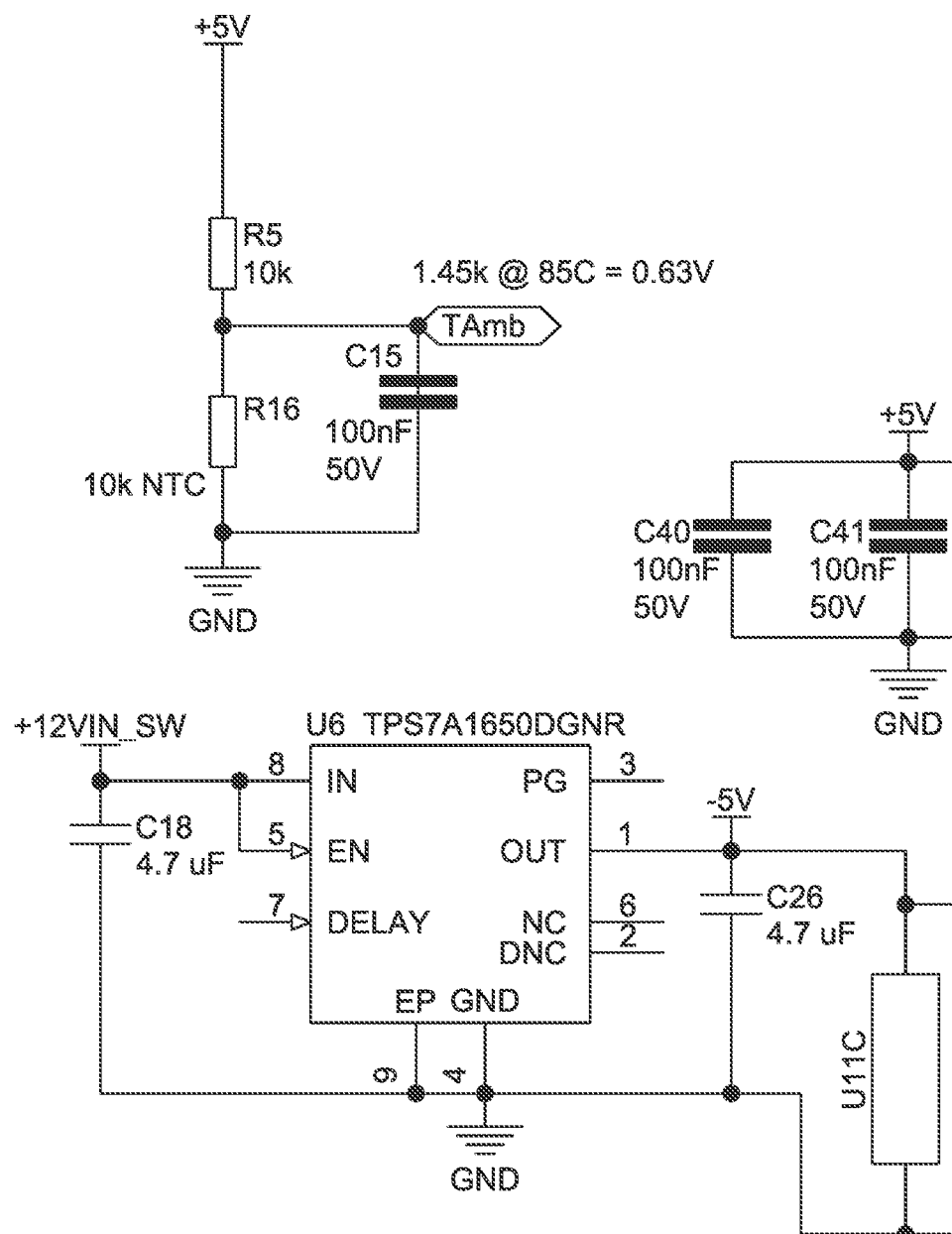
Figure 3G:
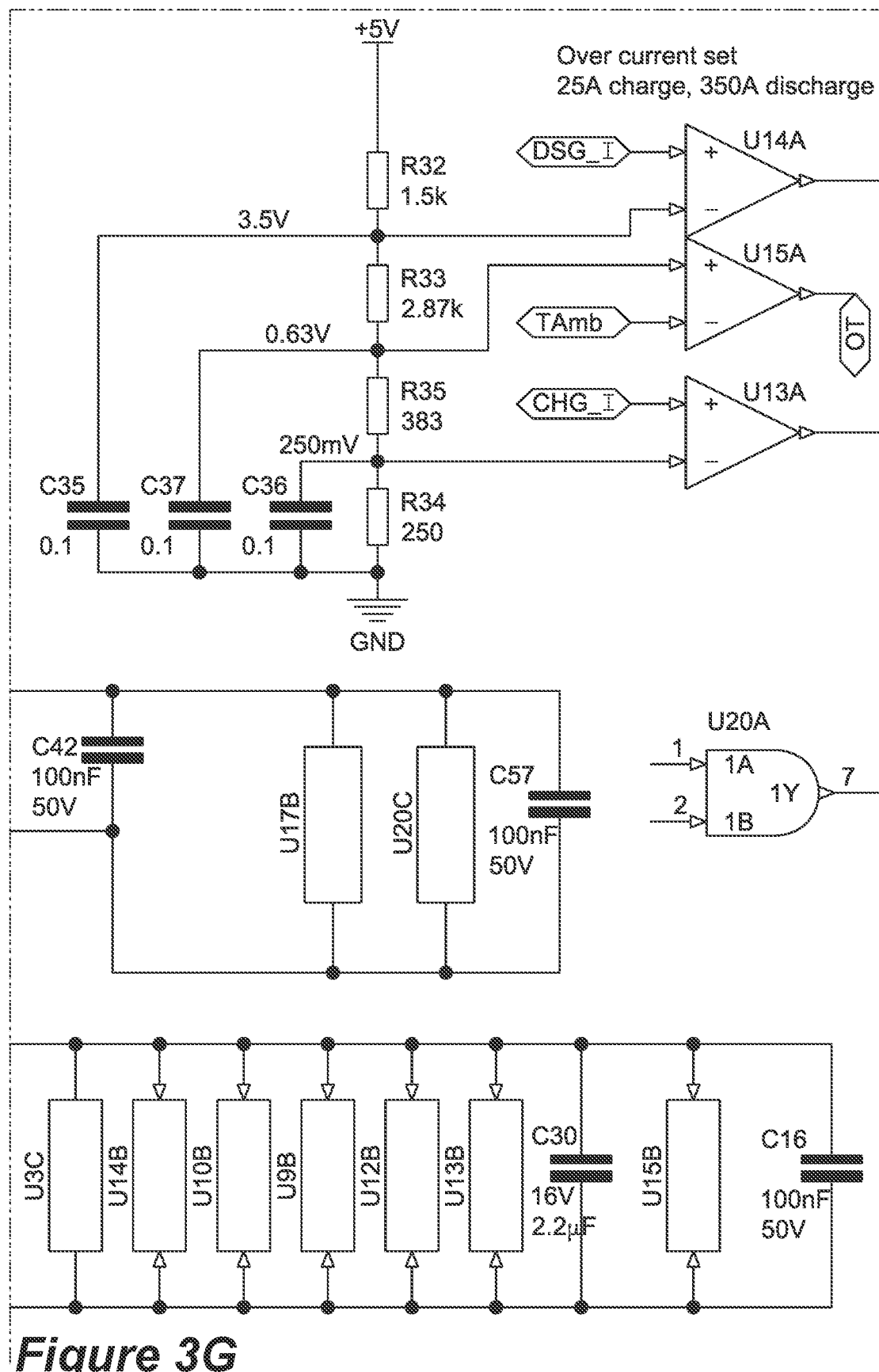
Figure 3H:
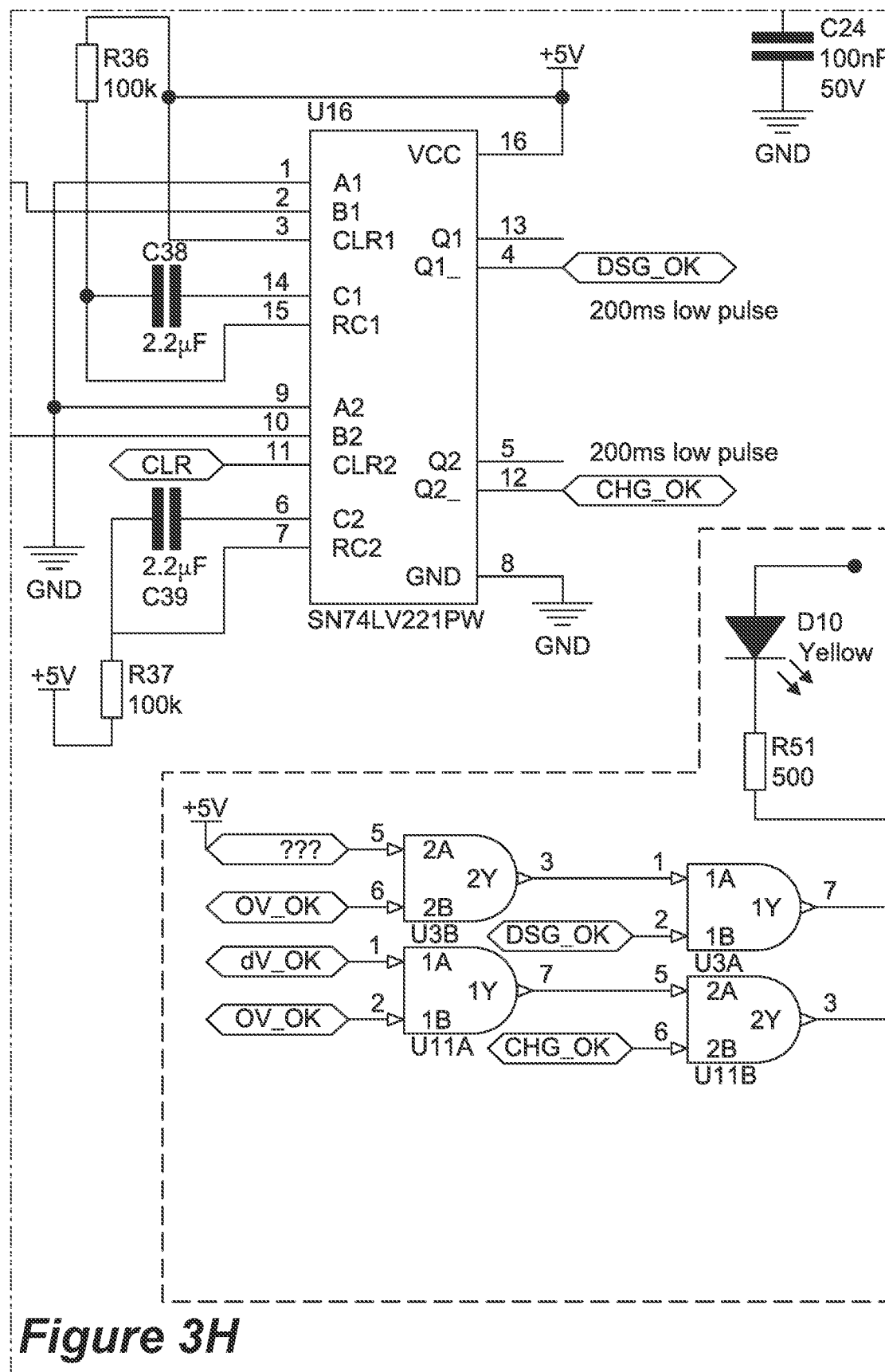
Figure 3I:
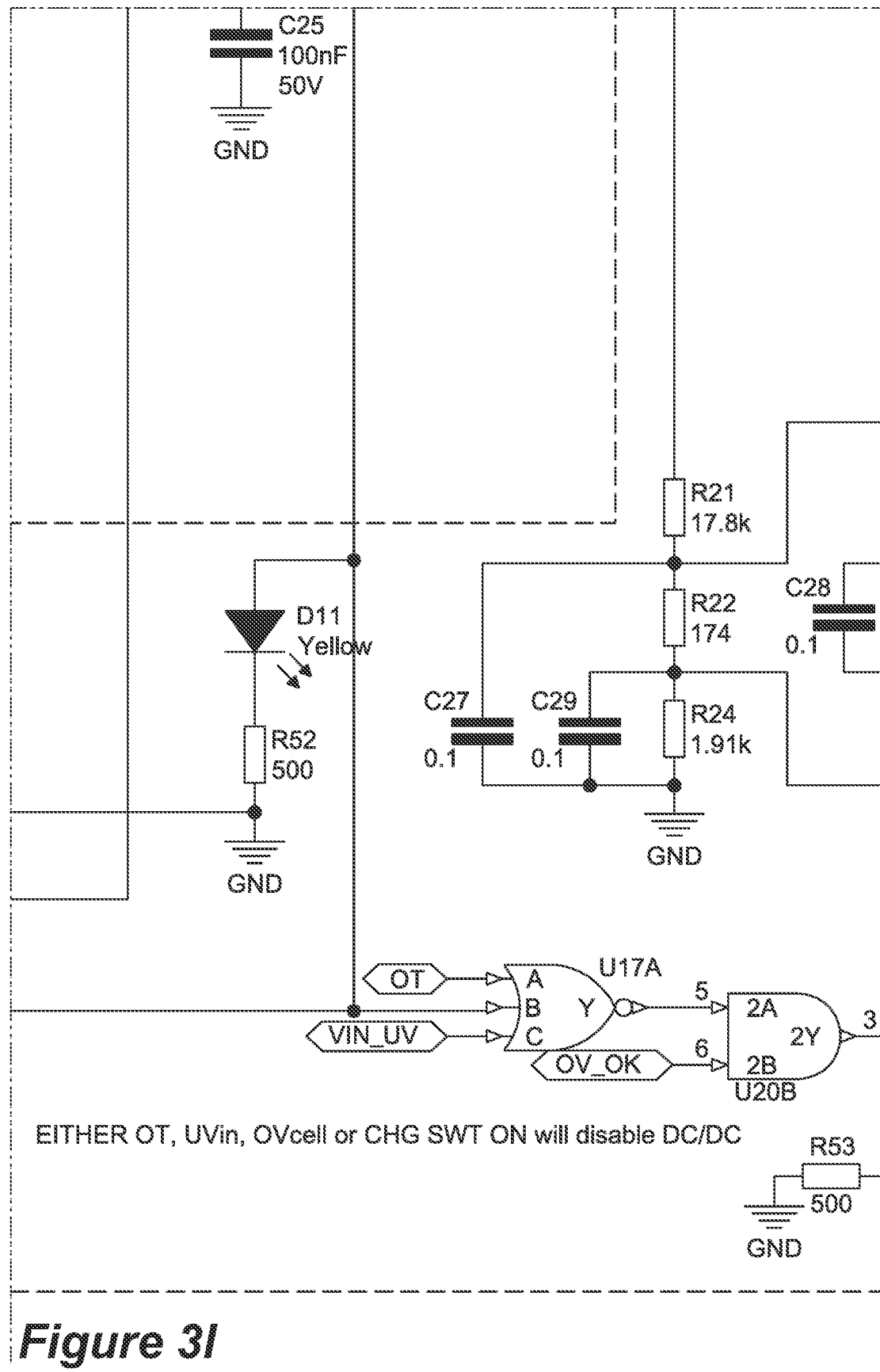
Figure 3J:
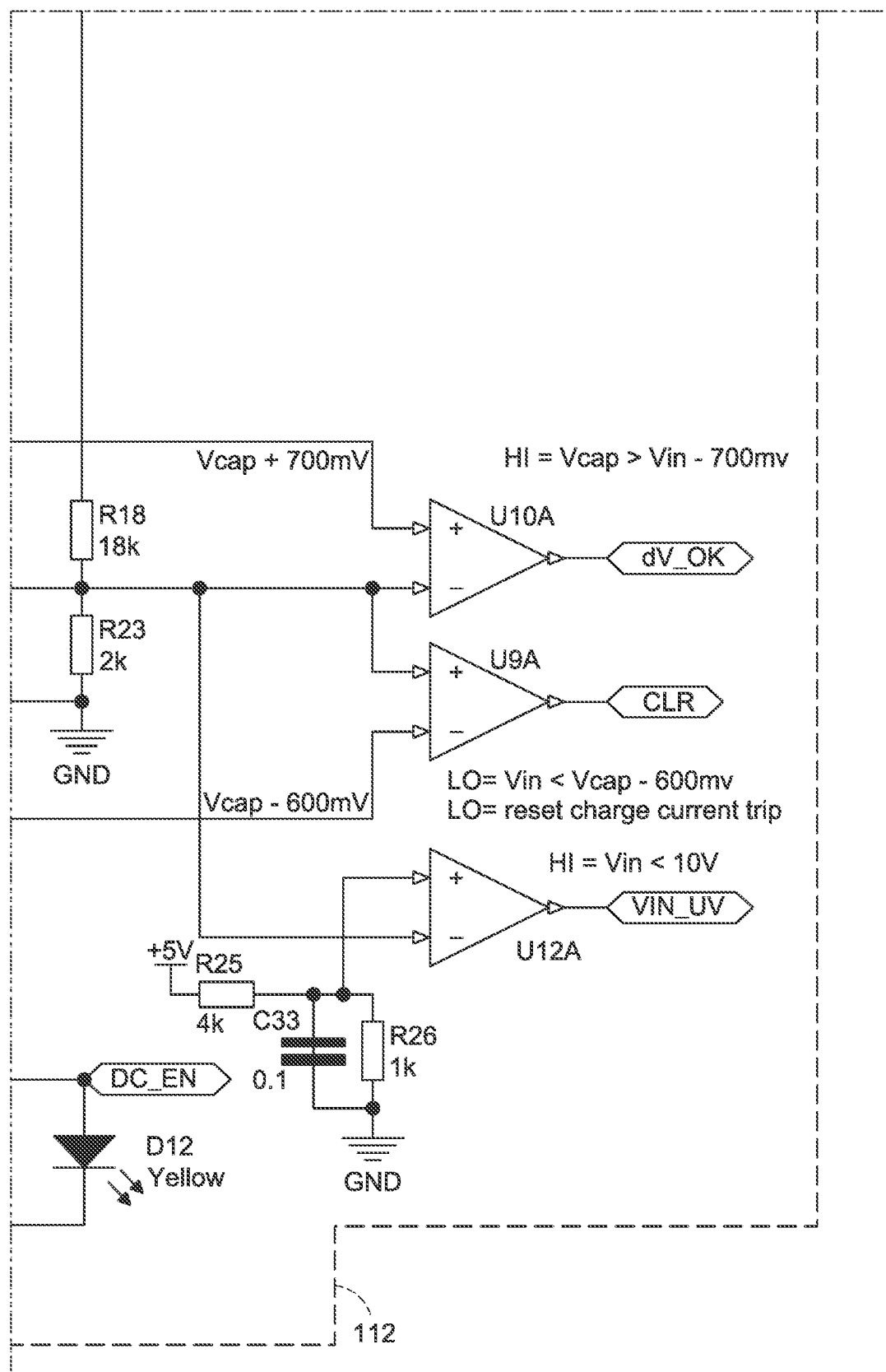

FIG. 2 illustrates an exemplary detailed block diagram for the module of FIG. 1. As shown, the switching circuit 108 may include one or more switches (for example, field effect transistors (FETs) or similar switching components) coupled between the terminal 102b and a current shunt. In some embodiments, the switching circuit 108 may also include one or more thermistors. In some embodiments, one or more of these components may not be included in the switching circuit 108. The FETs may provide controls for charging or discharging the cells 116 during the bidirectional transient voltage support operation. For example, the FETs may provide voltage discharge limits on the cells 116 (for example, to reduce a likelihood that the cells may be damaged from exposure to an excessively high transient voltage via the terminal 102b). Similarly, the FETs may provide voltage charge limits on the cells 116, which reduce a likelihood that the components of the external battery system may be damaged from exposure to an excessively high transient voltage via the terminal 102b. In some embodiments, the current shunt may provide current and/or voltage measurements. Accordingly, based on the measurements by the current shunt, the module controller 112 may control one or more of the FETs. When the module controller 112 allows the cells to discharge power in response to a transient voltage on the terminal 102b, the module controller 112 may monitor the discharge current to ensure it stays below the discharge current threshold. When the module controller 112 allows the cells to charge power in response to a transient voltage on the terminal 102b, the module controller 112 may monitor the charge current to ensure it stays below the charge current threshold.

The charge circuit 110 may comprise one or more of a DC/DC charger (for example, a DC/DC converter), one or more switching circuits, a fuse, a power supply (for example, a 5V power supply or a power supply of any other voltage), a thermistor, and/or a control switch. In some embodiments, one or more of these components may not be included in the charge circuit 110. The charge circuit 110 may include two or more branches. For example, the power supply and the control switch may form a separate branch from the fuse, the switching circuit, and the DC/DC charger, with both branches coupled to the terminal 102b. The power supply and the control switch may be used to provide power to the module controller 112. In some embodiments, the power supply may be interrupted by the control switch tied to the control input 106. Accordingly, when the control input 106 is deactivated, the control switch may be opened such that the power supply does not draw any power from the terminal 102b. When the control input 106 is activated, the control switch may be closed such that the power supply is able to draw power from the terminal 102b.

In some embodiments, the branch comprising the fuse, the switching circuit, and the DC/DC charger may couple the cells 116 to the terminal 102b. The fuse may protect the DC/DC charger and the switching circuit. The switching circuit may control coupling the DC/DC charger to the fuse and the terminal 102b. Each of the switching circuit and the DC/DC charger may be controlled by the module controller 112. A combination of the switching circuit and the DC/DC charger (and the fuse) may help limit a current flow from the terminal 102b to the cells 116. Furthermore, the DC/DC charger may charge the cells 116 to a desired or threshold charge or voltage amount. For example, the module controller 112 monitor a voltage of the cells 116 and control the switching circuit and the DC/DC charger to charge the cells 116 to the threshold voltage or charge.

The balancing circuit 114 may be used to balance voltages of the cells 116 such that the cells 116 have a same voltage as each other. In some embodiments, the cells 116 may store a charge that can be dispensed to a component of the external battery system or that can be used to support bidirectional transient voltages (for example, supply a voltage when needed, such as when the external battery system experiences an under voltage situation, and absorb a voltage when needed, such as when the external battery system experiences an over voltage situation).

In some embodiments, one or more of the components of the module 100 (for example, the module controller 100) may measure various parameters, such as an input battery voltage, a capacitor voltage, a switch input current, a switch output current, a printed circuit board (PCB) temperature, and an individual capacitor overvoltage. The one or more of the components of the module 100 (for example, the module controller 100) may generate various logical flags. For example, the module controller 100 may generate and/or monitor a control signal from the user input, which represents a signal from the external battery system to enable the module 100 charge and switch functions. As noted above, the control signal may be received at control input 106 based on which on all power consuming devices within the module 100 may be activated and/or deactivated.

The module controller 112 may control the bidirectional transient voltage support of the cells 116 via the switching circuit 108 and may control the charging the cells 116 via the charge circuit 110 based on one or more of the control signals and processes below.

The module controller 112 may generate a discharge FET control signal. The discharge FET control signal may drive a discharge FET on/off. The discharge FET may comprise one or more of the FET switches of the switching circuitry 108 and may be turned off (for example, may not discharge) when one of the cells 116 is in an overvoltage condition or when the discharge output current during a transient voltage discharge exceeds a set value.

The module controller 112 may generate a charge FET control signal. The charge FET control signal may drive a charge FET on/off. The charge FET may comprise one or more of the FET switches of the switching circuitry 108 and may be turned off when one of the cells 106 is in an overvoltage condition or when the charge input current during a transient voltage charge exceeds a set value. The charge FET may also be turned off until the voltage difference between the cell 116 and the external battery system is within a set value determined to be safe.

The module controller 112 may generate a battery under voltage signal. The battery under voltage signal may be active when the input battery voltage (for example, as sensed by the sense input) is below a set value. It is used to disable the DC/DC charger to prevent deep discharge of the battery or other power source of the external battery system. The module controller 112 may also generate a cell overvoltage signal. The cell overvoltage signal is active if any of the cells 116 is above a set value. The cell overvoltage signal is used to disable the charge FET and the DC/DC charger.

The module controller 112 may generate an over temperature signal. The over temperature signal may be active if a temperature of the module 100 (for example of one or more of the cells 116, the DC/DC charger or any other component of the module 100) exceeds a set value. The over temperature signal may cause the module controller 112 to disable the DC/DC charger to prevent further heat dissipation within the module 100 and the cells 116.

The module controller 112 may generate an over current—discharge signal. The over current—discharge signal may be active if an output or discharge transient load current exceeds a set value. The over current—discharge signal may be latched "on" for ~200 ms and then auto cleared. The module controller 112 may generate an over current—charge signal. The over current—charge signal is active if the input or charge current exceeds a set value. The over current—charge signal is latched active for ~200 ms and then auto cleared.

The module controller 112 may generate a voltage window ok (battery to cells 116) signal. The voltage window ok signal may be active when the cells 116 have charged to within a set voltage window of the battery voltage. The voltage window ok signal is used as one of the conditions for turning ON the charge FET. The module controller 112 may generate a charge FET/close clear flag. The charge FET/close clear flag may be active when the input voltage (for example, the voltage at terminal 102b) falls below the cell 116 voltage. In the event that the charge FET has been opened by over current, but then the load needs a transient output current, this signal may terminate the 200 ms latch and allow the charge FET to turn back on quickly to support load. Thus, the module controller 112 may control the switching circuit 108 to ensure that the switching circuit 108 is closed (for example, such that the cells 116 are coupled to the terminal 102b) when the cells have a charge or voltage within a threshold range of a voltage of the battery.

The module controller 112 may generate a DC/DC charger enable signal. The DC/DC charger enable signal may be active when there is no cell overvoltage, no over temperature, no battery under voltage, and the charge FET is off. The DC/DC charger enable signal may ensure that the charge FET and the DC/DC charger cannot be on simultaneously. Thus, the module controller 112 may control the charge circuit 110 to ensure that the cells 116 are charged to within the threshold range of the voltage of the battery (for example when the module 100 is initially coupled to the battery). The module controller 112 may ensure that the DC/DC charger charges the cells 116 and that the switching circuit 108 remains open (for example, opens the charge FET) while the cells 116 are being charged to within the threshold range of the voltage of the battery.

The module 100 in combination with the external battery system may provide for a hybrid parallel configuration with charge control and a solid state switch between the two energy storage elements (for example, the cells 116 and the battery of the external battery system). The module 100 may have three power terminals; 1—ground (terminal 102c), 2—capacitor+ output (terminal 102a), and 3—battery+ input/output (terminal 102b).

When the battery is first connected to the cells 116 of the module 100 and the cells 116 are discharged, if the battery is active (for example, charged and coupled such that the battery is providing power to one or more loads), then the switching circuit 108 may be held in an open state (for example, by the module controller 112) to prevent uncontrolled large currents from rushing into the discharged cells 116. At the same time (or at substantially the same time while the switching circuit 108 is held open), the charge circuit 110 (for example, via the integrated DC/DC charger) may be activated by the module controller 112 and may provide a controlled safe charge to the cells 116 until the cells 116 charge to a level near that of the battery voltage (for example, within a threshold window of the battery voltage). In some embodiments, the threshold window may be a window of +/−5 volts or 10 volts. Once the cells 116 have a voltage within the threshold window, the module controller 112 may deactivate the charge circuit 110.

Once the cells 116 have a charge within the threshold window of the battery voltage, the module controller 112 may verify that no temperature or overvoltage faults or conditions within the module 100 (for example, via the over temperature or overvoltage signals described herein). The module controller 112 may cause the switching circuit 108 to enter a closed state (for example, one or more solid state switches of the switching circuit 108 may be closed). By closing the switching circuit 108, the cells 116 and the battery are placed in a parallel connection with very low resistance. Accordingly, the cells 116 can provide transient power support to the battery at terminal 102b while the switching circuit 108 is closed.

However, if the module controller 112 detects or otherwise determines that a transient discharge level exceeds a set value, the module controller 112 may open the discharge FET (for example, cause the switching circuit 108 to enter the open state). For example, if the module controller 112 detects the over current—discharge signal discussed above, the module controller 112 may determine that the discharge current from the cells 116 through the switching circuit 108 to the battery exceeds the set value and may open the discharged FET. By detecting the over current—discharge signal, the module controller 112 may prevent damage to the module 100 or potentially to the external overload condition. The module controller 112 may then control the switching circuit (for example, the discharge FET) in a "hiccup mode" in which the switching circuit 108 (for example, the discharge FET) closes/resets itself into the path between the cells 116 and the battery. If the module controller 112 determines that the overload remains (for example, the over current—discharge signal is still present), the module controller 112 may continue to monitor over current—discharge signal for the overload condition. Accordingly, if the overload remains, the discharge FET (and the switching circuit 108) may repeat this cycle. In some embodiments, the duty cycle of the hiccup mode may be extremely low. For example, a hiccup frequency (for example, a frequency at which the cycle of the hiccup mode is repeated) may be less than 10 Hz.

If the module controller 112 detects a short circuit event from the terminal 102b to the terminal 102c, the switching circuit 108 (for example, the discharge FET) may be transitioned to the open state by the module controller 112. However, in such a condition, the module 100 may then be unpowered because the terminal 102b voltage may be 0V following the short circuit. Thus, during such a short circuit fault, there may be no hiccup mode available and the switching circuit 108 (for example, the discharge FET) may simply remain in the open state and the module 100 may shut down while preserving the charge on the cells 116.

Alternatively, or additionally, if the cells 116 were to be quickly discharged through the terminal 102a due to a large load, such as engaging a starter motor, or so forth, the voltage of the cells 116 may decrease. Such a decrease in the voltage of the cells 116 may cause a current to flow from the battery to the cells 116 through the DC/DC charger and charger switch FET. For example, the module controller 112 may cause both the switching circuit 108 and the charge circuit 110 to be in closed states such that a parallel path between the cells 116 and the terminal 102b exists. If this input current through the charge circuit 110 exceeds a set value, the module controller 112 may cause the charge circuit 110 (for example, the charger switch FET) to enter an open state to prevent voltage dips or large currents from the input battery. Accordingly, the module controller 112 may protect the external battery system. In some embodiments, the module controller 112 may control the charge circuit 110 (for example, the charger switch FET) to operate in a hiccup mode. In some embodiments, the voltage difference between the cells 116 and the battery may become large or may increase when the charge circuit 110 (for example, the charger switch FET) first opens. When this happens, the module 100 may control, via the module controller 112, the charge circuit 110 (for example, the charger switch FET) to maintain the open state and may activate the charge circuit 110 (for example, the DC/DC charger of the charge circuit 110) to recharge the cells 116 in a controlled manner. Once the cells 116 have been recharged and no faults are detected by the module controller 112, the module controller 112 may cause the charge circuit 110 (for example, the charger switch FET) to close. In some embodiments, this scenario can also occur if the battery voltage suddenly increases due to an external source such as an alternator or other charging device. If the battery voltage were to suddenly increase while the charge circuit 110 (for example, the charger switch FET) is closed and the cells 106 are parallel to the battery, the input current through the charge circuit 110 may exceed the set value and cause the charge circuit 110 (for example, the charger switch FET) to open. The scenario may be similar to the starter motor example above. If the charge circuit 110 (for example, the charger switch FET) is caused to open due to a high input charge current, but the module controller 112 detects or otherwise receives an indication that a transient discharge pulse is suddenly required, the hiccup mode of the charge circuit 110 may terminate. The charge circuit 110 (for example, the charger switch FET) may be closed by the module controller 112 to support this load. The module controller 112 may detect the transient discharge pulse by sensing that the terminal 102b voltage has dropped below the terminal 102a voltage. Discharge and charge current levels can be independent set points and may be mapped to the respective circuit (for example, FET in the solid state switch (back to back FETS).

FIG. 3 illustrates a schematic diagram for an exemplary implementation of the block diagrams of FIGS. 1 and 2. The control circuit 300 may provide an exemplary circuit that implements the functions described above in relation to the block diagrams of FIGS. 1 and 2. Corresponding groups of components in the control circuit 300 are identified as forming one or more blocks of the block diagrams of FIGS. 1 and 2. For example, capacitors C1-C12 in the top left of the control circuit 300 are identified as corresponding to the cells 116 of FIGS. 1 and 2. However, one or more components shown in the control circuit 300 may be omitted or repositioned in a different configuration without changing the general functionality as described herein. Additionally, or alternatively, one or more additional components may be included in the control circuit 300 while maintaining the general functionality described herein. Furthermore, one or more components shown in the corresponding circuits or groups of components may be omitted or repositioned in a different configuration without changing the general functionality as described herein. Additionally, or alternatively, one or more additional components may be included in the corresponding circuits or groups of components while maintaining the general functionality described herein. In some embodiments, the control portions of the control circuit 300 may be representative of the module controller 112. As depicted, the control circuit 300 may include various components, such as resistors, capacitors, inductors, fuses, cells, logic gates, and so forth in a particular configuration. However, other configurations of similar or different components may be used to provide the functionality of the control circuit 300 charger as described herein.

Figure 4:
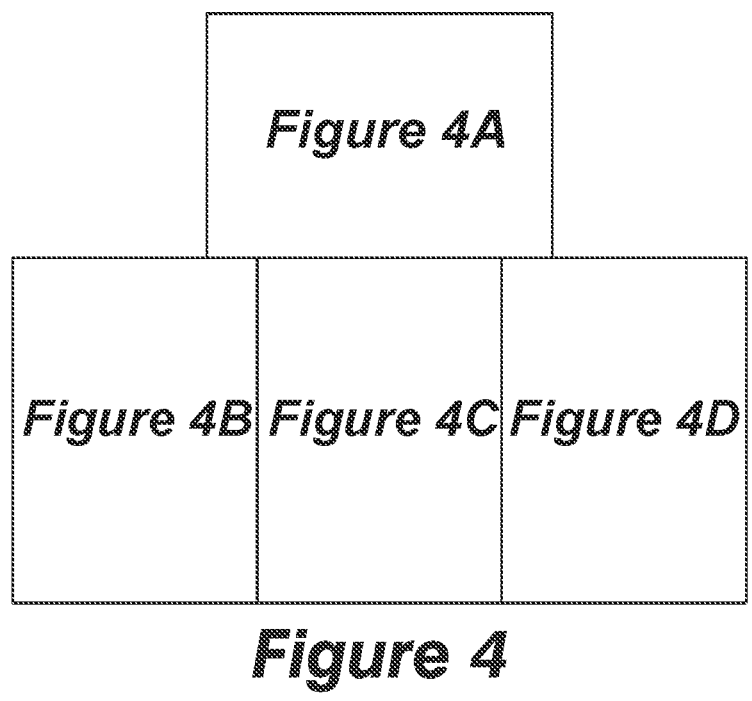
Figure 4A:
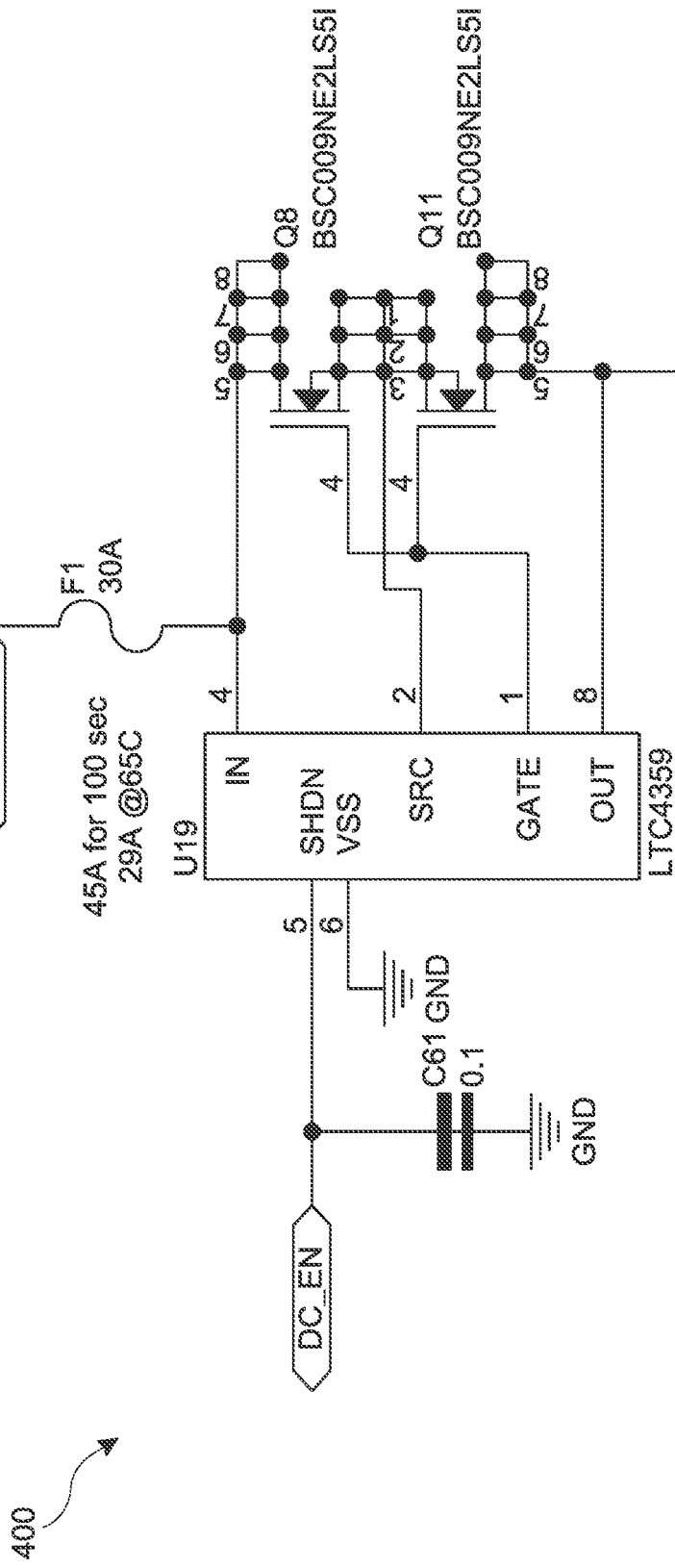
Figure 4B:
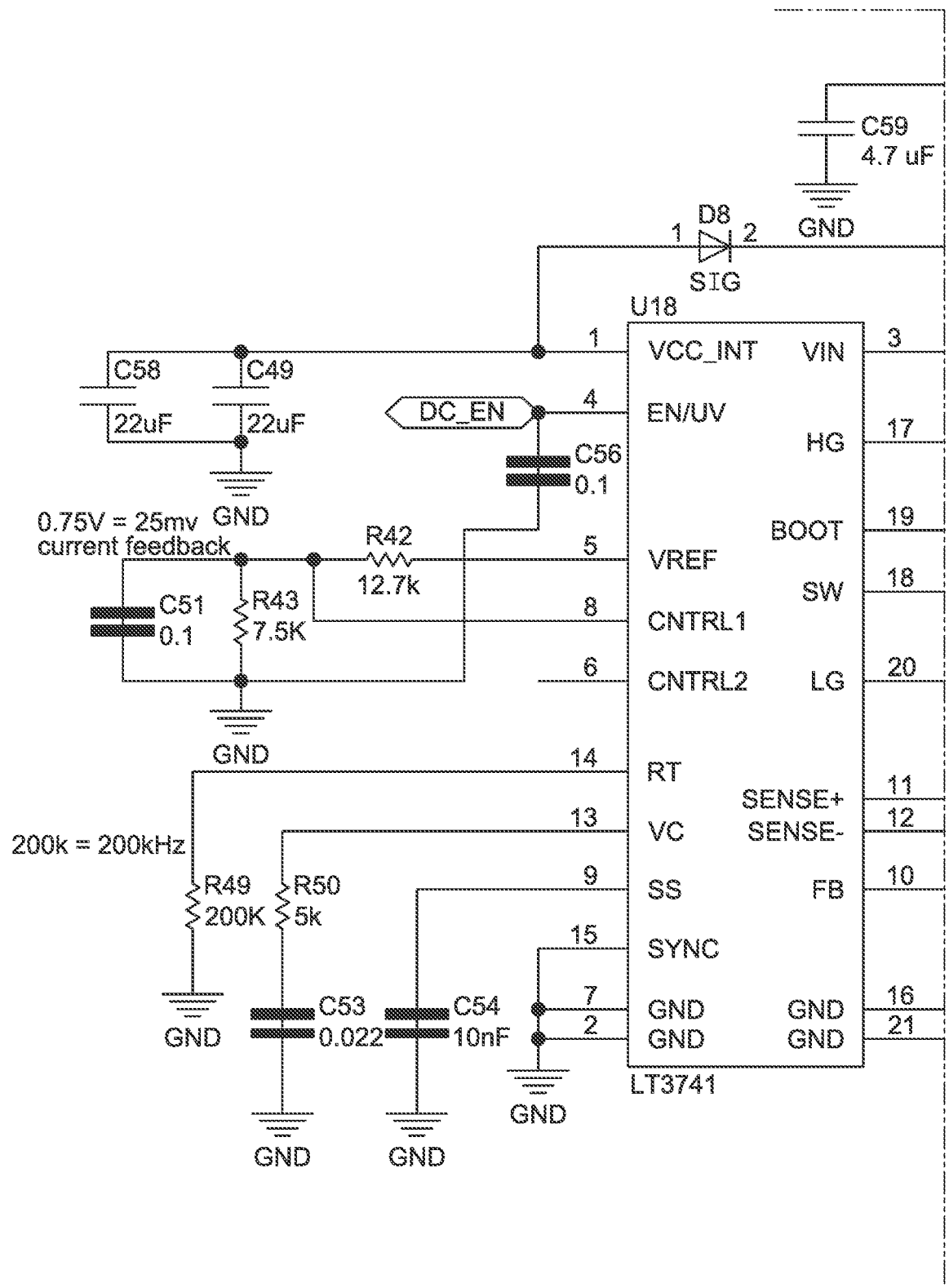
Figure 4C:
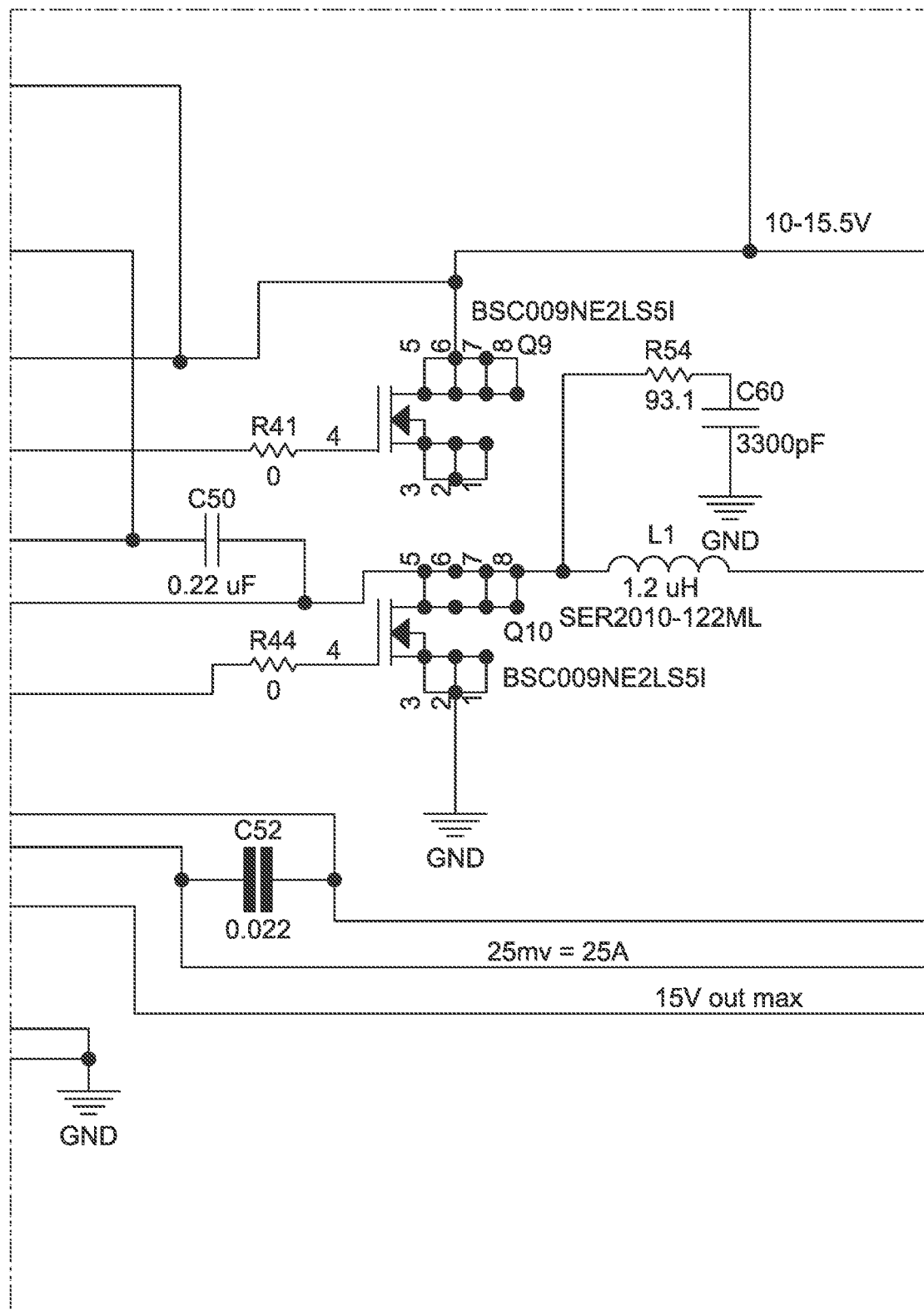
Figure 4D:
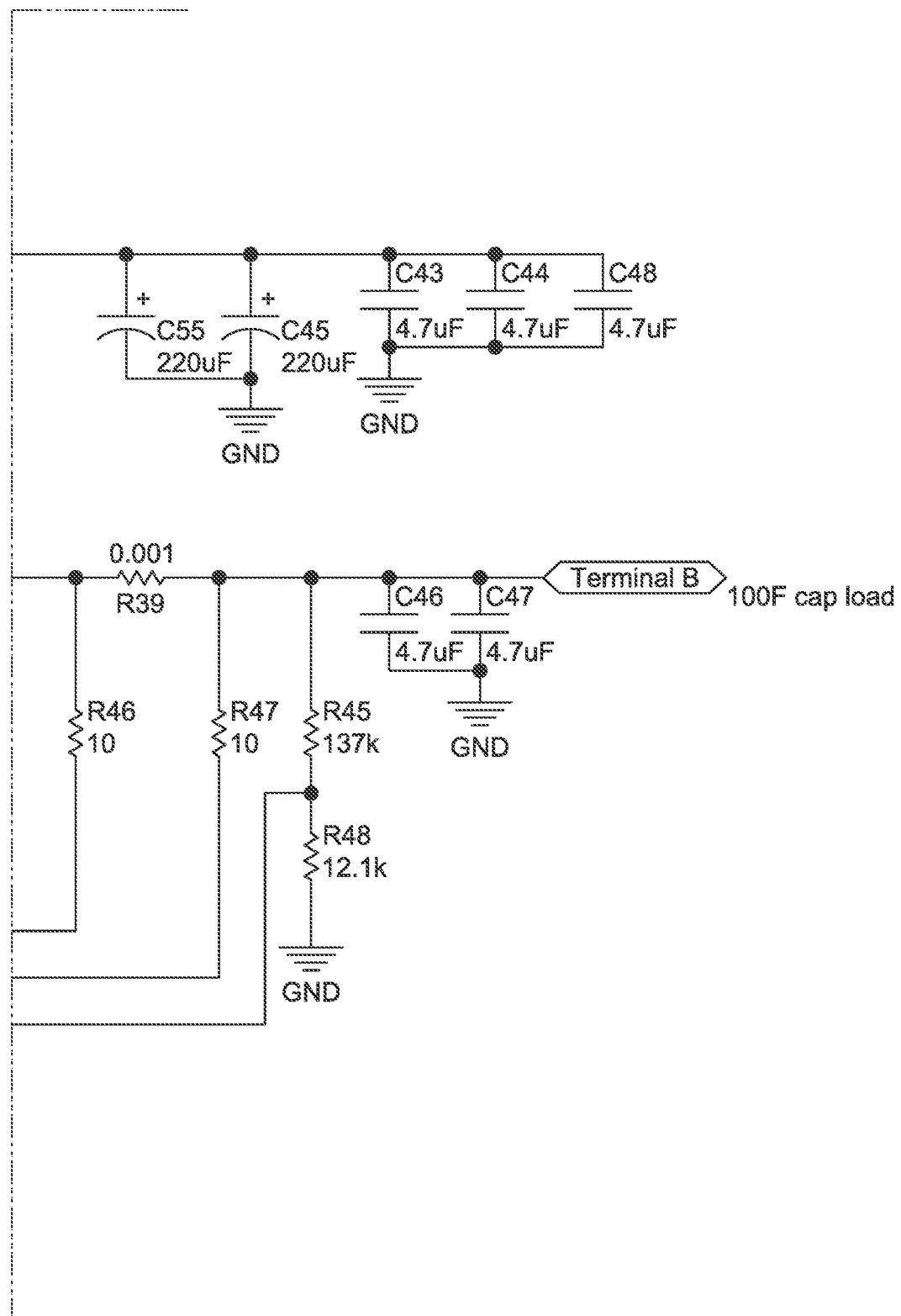

FIG. 4 illustrates a schematic diagram for an exemplary DC/DC charger as shown in FIG. 2. One or more components shown in the DC/DC charger 400 may be omitted or repositioned in a different configuration without changing the general functionality as described in relation to the DC/DC charger in FIG. 2. Additionally, or alternatively, one or more additional components may be included in the DC/DC charger 400 while maintaining the general functionality described herein. Any specific values for the parameters of the various components in FIGS. 3 and 4 are for illustrative purposes only. As depicted, the DC/DC charger may include various components, such as resistors, capacitors, inductors, fuses, and so forth in a particular configuration. However, other configurations of similar or different components may be used to provide the functionality of the DC/DC charger as described herein.

Figure 5:
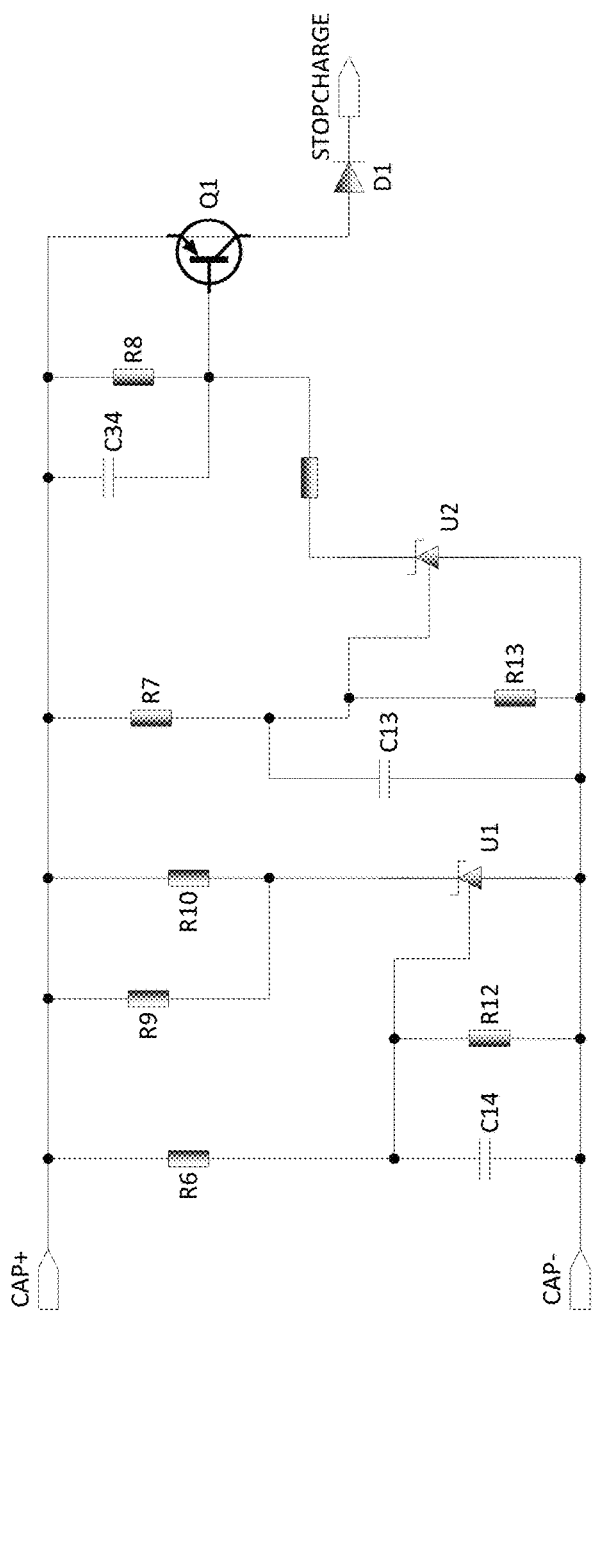
FIG. 5 illustrates a schematic diagram for an exemplary implementation of a balancing circuit and overvoltage alarm for cells of the modules of FIGS. 1 and 2.

FIG. 5 illustrates a schematic diagram for an exemplary implementation of a balancing circuit and overvoltage alarm for cells of the modules of FIGS. 1 and 2. In some embodiments, the balancing circuit 500 may replace the balancing circuit 114 described herein. In some embodiments, the components shown in the balancing circuit 500 may vary such that additional components are included (not shown) or shown components are excluded. The balancing circuit 114 may balance a voltage in a coupled cell or cells 116 and output a flag to stop use of the coupled cell or cells 116 in an alarm or fault condition. In some embodiments, the balancing circuit may also provide overvoltage sensing and alarm outputs for each cell 116. As depicted, the balancing circuit 500 includes various components, including resistors, capacitors, diodes, Zener diodes, and so forth, in a particular configuration. However, other configurations of similar or different components may be used to provide the functionality of the balancing circuit 500 as described herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments.

The various illustrative blocks, modules, and circuits described in connection with the implementations disclosed herein may be implemented or performed with a general purpose hardware processor, a Digital Signal Processor (DSP), an Application Specified Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, for example, a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

Various modifications of the above-described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed:

1. An apparatus for storing energy, comprising:
a plurality of energy storage cells;
a switching circuit configured to control a transient voltage support to a battery provided by the plurality of energy storage cells;
a charging circuit configured to charge the plurality of energy storage cells; and
a processing system configured to:
activate the charging circuit to charge the plurality of energy storage cells,
control the switching circuit to control the transient voltage support of the plurality of energy storage cells to the battery, maintain the switching circuit in the open state while activating the charging circuit to charge the plurality of energy storage cells until the plurality of energy storage cells obtains a charge level with a threshold range of the battery, measure a voltage through the switching circuit, measure a temperature of the plurality of energy storage cells, and maintain the switching circuit in a closed state based on the temperature of the energy storage cells being below a first threshold value and the voltage through the switching circuit being below a second threshold value, wherein the switching circuit and the charging circuit provide parallel paths between the plurality of energy storage cells and the battery terminal.

2. The apparatus of claim 1, wherein the switching circuit is configured to control the plurality of energy storage cells to provide the transient voltage support to the battery while the temperature is below the first threshold value and while the voltage is below the second threshold value.

3. The apparatus of claim 2, wherein the processing system is further configured to cause the switching circuit to transition to the open state based on the voltage of the energy storage cells being greater than or equal to the second threshold value.

4. The apparatus of claim 3, wherein the processing system is further configured to cause the switching circuit to operate in a hiccup mode, wherein the hiccup mode measures the voltage through the switching circuit and maintains the switching circuit in the open state when the voltage through the switching circuit is greater than or equal to the second threshold value and causes the switching circuit to transition to the closed state when the voltage through the switching circuit is less than the second threshold value.

5. The apparatus of claim 1, wherein the processing system is further configured to:

measure a current flow from the battery terminal to the plurality of energy storage cells through the switching circuit;

determine whether the current flow exceeds a threshold value; and when the current flow is greater than or equal to the threshold value, cause the switching circuit to transition to the open state.

6. The apparatus of claim 5, wherein the processing system is further configured to cause the switching circuit to operate in a hiccup mode, wherein the hiccup mode measures the current flow between the battery terminal and the plurality of energy storage cells through the switching circuit and controls the charging circuit to charge the plurality of energy storage cells when the current flow is greater than or equal to the threshold value and causes the switching circuit to transition to the closed state when the current flow is less than the threshold value.

7. A method of controlling a plurality of energy storage cells, the method comprising:

controlling a switching circuit to control a transient voltage support to a battery provided by the plurality of energy storage cells;

activating a charging circuit to charge the plurality of energy storage cells;

maintaining the switching circuit in an open state while the charging circuit is activated to charge the plurality of energy storage cells until the plurality of energy storage cells obtains a charge level with a threshold range of the battery;

measuring a voltage through the switching circuit;

measuring a temperature of the plurality of energy storage cells; and maintaining the switching circuit in a closed state based on the temperature of the energy storage cells being below a first threshold value and the voltage through the switching circuit being below a second threshold value, wherein the switching circuit and the charging circuit provide parallel paths between the plurality of energy storage cells and the battery terminal.

8. The method of claim 7, wherein controlling the switching circuit comprising controlling the plurality of energy storage cells to provide the transient voltage support to the battery while the temperature is below the first threshold value and while the voltage is below the second threshold value.

9. The method of claim 8, further comprising transitioning the switching circuit to the open state based on the voltage of the energy storage cells being greater than or equal to the second threshold value.

10. The method of claim 9, further comprising operating the switching circuit in a hiccup mode, wherein the hiccup mode measures the voltage through the switching circuit and maintains the switching circuit in the open state when the voltage through the switching circuit is greater than or equal to the second threshold value and causes the switching circuit to transition to the closed state when the voltage through the switching circuit is less than the second threshold value.

11. The method of claim 7, further comprising:

measuring a current flow from the battery terminal to the plurality of energy storage cells through the switching circuit;

determining whether the current flow exceeds a threshold value; and when the current flow is greater than or equal to the threshold value, transitioning the switching circuit to the open state.

12. The method of claim 11, further comprising operating the switching circuit in a hiccup mode, wherein the hiccup mode measures the current flow between the battery terminal and the plurality of energy storage cells through the switching circuit and controls the charging circuit to charge the plurality of energy storage cells when the current flow is greater than or equal to the threshold value and causes the switching circuit to transition to the closed state when the current flow is less than the threshold value.

13. A non-transitory computer readable medium comprising instructions stored thereon that when executed by at least one processor of a computing device cause the computing device to:

control a switching circuit to control a transient voltage support of the plurality of energy storage cells to a battery coupled to a battery terminal;

activate a charging circuit to charge the plurality of energy storage cells;

maintain the switching circuit in the open state while activating the charging circuit to charge the plurality of energy storage cells until the plurality of energy storage cells obtains a charge level with a threshold range of the battery;

measure a voltage through the switching circuit;

measure a temperature of the plurality of energy storage cells; and maintain the switching circuit in a closed state based on the temperature of the energy storage cells being below a first threshold value and the voltage through the switching circuit being below a second threshold value, wherein the switching circuit and the charging circuit provide parallel paths between the plurality of energy storage cells and the battery terminal.

14. The non-transitory computer readable medium of claim 13, wherein the computing device is caused to control the switching circuit to control the plurality of energy storage cells to provide the transient voltage support to the battery while the temperature is below the first threshold value and while the voltage is below the second threshold value.

* * * * *